United States Patent [19]

Tsuchiya et al.

[11] Patent Number: 5,681,495
[45] Date of Patent: Oct. 28, 1997

[54] ALTERNATOR POWER-SUPPLY TYPE ELECTRIC HEATING CONTROL APPARATUS

[75] Inventors: Kenichi Tsuchiya, Kobe; Toru Fujiwara, Tokyo, both of Japan

[73] Assignee: Mitsubishi Denki Kabushiki Kaisha, Tokyo, Japan

[21] Appl. No.: 581,328

[22] Filed: Dec. 29, 1995

[30] Foreign Application Priority Data

Feb. 28, 1995 [JP] Japan .................................. 7-040200

[51] Int. Cl.$^6$ .................................................. H05B 1/02
[52] U.S. Cl. ........................ 219/506; 219/481; 219/508; 322/15; 322/90; 123/142.5 R
[58] Field of Search ........................... 219/202–206, 219/497, 501, 507–509, 494, 506, 481, 488; 322/8, 15, 90; 123/142.5 R

[56] References Cited

U.S. PATENT DOCUMENTS

| | | |
|---|---|---|
| 5,087,869 | 2/1992 | Kuriyama et al. .................... 322/15 |
| 5,321,231 | 6/1994 | Schmalzriedt et al. .............. 219/497 |

FOREIGN PATENT DOCUMENTS 1483033  8/1977  United Kingdom .

OTHER PUBLICATIONS

"Development of an Alternator-Powered Electrically-Heated Catalyst System", by P. Laing, SAE paper 941042 pp. 137–143.

Primary Examiner—Mark H. Paschall
Attorney, Agent, or Firm—Sughrue, Mion, Zinn, Macpeak and Seas

[57] ABSTRACT

An alternator power-supply type electric heating control apparatus, comprising (1) a switch for switching an output of an alternator including a field coil, a stator coil, and a rectifier to a first state where the output is connected to a battery and vehicle-mounted electrical load side or a second state where the output is connected to an object to be heated which is heated by current conduction; (2) a controller which performs an output control of the alternator by a duty control of a field current that is supplied to the field coil, performs the switching of the switch, detects a failed state, and causes a display unit to display the failed state to warn a driver; and (3) an object to be heated voltage control unit for controlling the duty control of the field current by a rectification wave of one phase of an output voltage of the alternator, rectified by the rectifier, so that a voltage of the object to be heated does not exceed a predetermined value.

5 Claims, 7 Drawing Sheets

(C) RELAY SWITCHING

ALTERNATOR POWER-SUPPLY TYPE ELECTRIC HEATING CONTROL APPARATUS

BACKGROUND OF THE INVENTION

1. Field of the Invention

The present invention relates to an alternator power-supply type electric heating control apparatus, and more particularly to an alternator power-supply type electric heating control apparatus which electrically disconnects an alternator and a battery, connects the alternator in series with an object to be heated to supply electric power to the object to be heated at a high voltage, and performs the heating of the object to be heated for a short time.

2. Description of the Related Art

Hitherto, Japanese Published Patent Application No. 1-33735, for example, is known as an alternator power-supply type electric heating control apparatus. Such a conventional apparatus supplies electric power to an object to be heated at a high voltage to heat the object. The aforementioned publication discloses an electric heating wire, attached to a window glass for removing ice on the window glass, as a heating object, and also discloses an apparatus which connects a switching device between an alternator, a battery and an electric heating wire so that a high voltage for the electric heating wire and a low voltage for the battery are obtained by the opening and closing of the switching device.

FIG. 7 is a circuit diagram showing the aforementioned conventional apparatus and shows an alternator 10. The alternator 10 includes a field coil 22 which is driven by an engine (not shown), a stator coil 20, and a rectifier 24. Also, there is shown a battery 12, a heating element (electric heating wire) 30 serving as an object to be heated, a display unit 14 for warning an operator of a failed state in which a terminal for detecting an output of the alternator is failed, a key switch 16a for starting or stopping the engine, an output regulating unit 18 for regulating an output of the alternator 10, and a controller 28. The controller 28 includes first switches 52a and 52b provided between the battery 12 and the alternator 10 and a second switch 51 provided between the heating element 30 and the alternator 10. The controller 28 further includes a control circuit 32. The control circuit 32 has means for switching the first and second switches, detection means for detecting the failed state, and means for causing the display unit 14 to display the failed state. To the control circuit 32 there is connected a manual switch 53 for starting the heating of the heating element 30.

Now, the operation will be described. The switches shown are in normal charging states. The 3-phase ac voltage of the stator coil, generated by the current conduction to the field coil 22 (which is described later), is smoothed by the rectifier 24 and charges the battery 12 through the first switch 52a which is the normally closed contact of the controller 28 from the output terminal A of the alternator 10. At this time, electric power from the alternator 10 is also supplied to the vehicle-mounted electrical load connected in parallel to the battery 12 at the same time (not shown).

The current conduction to the field coil 22 is performed by means of the output regulating unit 18. The output regulating unit 18 detects a voltage on the plus (+) terminal of the battery 12 through the display unit 14 and the key switch 16 and, if the terminal voltage is lower than a set voltage (for example, 14.5 V), the unit 18 will raise the current to the field coil 22 to increase power generation output. Thereafter, if the (+) terminal voltage of the battery 12 reaches the set voltage by the increase in the power generation output, the output regulating unit 18 will stop the current conduction to the field coil 22.

Thus, by varying the amount of current to the field coil 22 by comparison with the (+) terminal voltage of the battery 12, the output regulating unit 18 regulates the charging voltage to the battery 12 so that it is maintained constant.

Next, if the manual switch 53 and the second switch 51 are turned on at the normal charging control state shown in FIG. 7 and the control state also starts the current conduction to heating element 30, then the first switches 52a and 52b which are normally closed contacts, will be turned off by means of the control circuit 32 of the controller 28. With this, the battery 12 is disconnected from the output terminals of the alternator 10, so the (+) terminal voltage of the battery 12 becomes an open terminal voltage (about 12 V) and becomes lower than the set voltage. For this reason, the output regulating unit 18 increases the field current flowing through the field coil, but since the charging circuit has been disconnected by means of the second switch 52a, the (+) terminal voltage of the battery finally reaches its full excitation state without rising.

In a conventional apparatus such as described above the battery always reaches its full excitation state during the current conduction to the heating element 30, so the voltage to the object to be heated will depend upon the rotational frequency of the alternator 10, the resistance value of the object to be heated, and the maximum output characteristic of the alternator 10. Therefore, when an accelerator (not shown) is pressed down to increase the rpms of the engine and therefore the rpms of the alternator, the voltage to the object to be heated rises to 100 V or more and induces deformation, deterioration, and destruction of both the object to be heated and the alternator 10.

Also, since the switching of the second switch 51 is performed by the input of the manual switch 53 as the power generation of the alternator 10 continues at the time of the switching, the second switch 51 will also be made to open when a current is flowing through the switch, therefore deteriorating the contacts thereof.

In addition, abrupt variations in power generation torque may cause the engine to stall or a abrupt increases in engine rpm, and also may input an unpleasant feeling to the driver.

Furthermore, if the engine stalls during current conduction to the object to be heated, the field current flows through the key switch 16, the second switch 52b, and the field coil 22, because the open terminal voltage (normally 12 V) of the battery 12 is lower than the regulating voltage (normally 14.5 V). At this time, for example, when the field coil is 2.5 Ω and the battery voltage is 12 V, a field current of 4.8 A flows through the field coil 22. The electric power at that time is 57.6 W and becomes a loss in battery power.

Moreover, if the engine stalls during the aforementioned current conduction to the object to be heated, the voltages of both terminals of the display unit 14 become equal because the second switch 52b is connected to the a side, and consequently, the display unit 14 will be unable to display a warning of engine stall.

Finally, when a plurality of objects to be heated are connected, the power generation voltage of the alternator 10 fluctuates because the resistance value of the heating element 30, viewed from the alternator 10, varies, and consequently, there is the possibility that the fluctuation causes deformation, deterioration, and destruction to the heating element 30 and the alternator 10.

SUMMARY OF THE INVENTION

This invention has been made in order to overcome the problems such as described above.

It is accordingly an important object of the present invention to provide an alternator power-supply type electric heating control apparatus where there is no possibility of inducing destruction of an object to be heated or the alternator.

Another important object of the invention is to provide an alternator power-supply type electric heating control apparatus where there is no electric power loss if the engine stalls.

Still another important object of the invention is to provide an alternator power-supply type electric heating control apparatus which is capable of warning a driver of engine stall even when the engine is stalled during current conduction to an object to be heated.

A further important object of the invention is to provide an alternator power-supply type electric heating control apparatus which is capable of preventing engine stall when current conduction of an object to be heated has begun and also of preventing abrupt increases in engine rpm when the current conduction is ended.

According to one aspect of the invention, there is provided an alternator power-supply type electric heating control apparatus, comprising: (1) a switch for switching an output of an alternator including a field coil, a stator coil, and a rectifier to a first state where said output is connected to a battery and vehicle-mounted electrical load side or a second state where said output is connected to an object to be electrically heated; (2) a controller which controls an output of said alternator by a duty control of a field current that is supplied to said field coil, performs the switching of said switch, detects a failed state in which a terminal for detecting an output of the alternator is failed, and controls a display unit to display said failed state; and (3) voltage control means for controlling said duty control of said field current by means of one phase of an output voltage of said alternator so that a voltage supplied to said object does not exceed a predetermined value.

With this arrangement, the voltage of the object to be heated is controlled so as not to exceed a predetermined value by use of one phase of the output voltage of the alternator. Therefore, for example, even if an accelerator were pressed and engine rpms increased, there would be no possibility of the drive voltage of the object to be heated exceeding a predetermined value. Accordingly, destruction of the object to be heated and the alternator can be prevented.

In a preferred embodiment, the alternator power-supply type electric heating control apparatus further comprises engine stall judgment means for performing an engine stall judgment, based on said rectification wave, said field duty of said duty control, and the voltage of said battery, the controller disconnecting said field current at the time of said engine stall judgment and, when said engine stall judgment is performed in said second state, switches said switch to said first state.

With this arrangement, engine stall is judged with said rectification wave and said field duty, the field current is disconnected at the time of engine stall, and if the output of the alternator is in the second state, it will be switched to the first state. Accordingly, wasteful power loss can be prevented at the time engine stall occurrs.

In another preferred embodiment, the controller warns the driver of an engine stall by means of said display unit, when said engine stall judgment is performed.

With this arrangement, even if engine stall occurred in the second state during current conduction to the object to be heated, the driver could be warned of the occurrence of engine stall.

In still another preferred form of the invention, when said switching of said switch is going to be performed, said controller gradually reduces said field duty of said duty control before said switching, forcibly stops power generation of said alternator at the time of said switching, and gradually increases said field duty after said switching.

With this arrangement, the field current is gradually reduced before switching, the power generation of the alternator is forcibly stopped at the time of switching, and the field current is gradually increased after switching. Accordingly, the occurrence of engine stall can be prevented at the time of the switching between the first and second states, and engine rpms can be stabilized.

According to another aspect of the invention, there is provided an alternator power-supply type electric heating control apparatus, comprising (1) a switch for switching an output of an alternator including a field coil, a stator coil, and a rectifier to a first state where a battery and vehicle-mounted electrical load side is connected to said output or a second state where all of a plurality of objects to be heated which are heated by current conducting are selected and connected to said output at the same time or some of said plurality of objects to be heated are selected and connected to said output; (2) a controller having means regulating an output of said alternator to a regulation voltage, means performing the switching of said switch, means detecting a failed state in which a terminal for detecting an output of the alternator is failed, and means warning a driver of said failed state by means of said display unit; and (3) voltage control means for selecting and connecting said plurality of objects to be heated, based on input information, and controlling said duty control of said field current by means of one phase of an output voltage of said alternator so that voltages of said objects to be heated do not exceed a predetermined value, and varying said predetermined value in accordance with a connection state of said objects to be heated.

With this arrangement, when all of a plurality of objects to be heated are selected and heated at the same time or some of them are selected and heated, the limitation value of the power generation voltage is varied according to the connection state of the objects to be heated and the field current is controlled by means of one phase of the output voltage of the alternator so that the voltages of the objects to be heated do not exceed the limitation value. Accordingly, the deformation, deterioration, and destruction of the objects to be heated and the alternator can be prevented.

BRIEF DESCRIPTION OF THE DRAWINGS

The present invention will be described in further detail with reference to the accompanying drawings, in which.

DETAILED DESCRIPTION OF THE PREFERRED EMBODIMENTS

Embodiment 1

Figure 1:
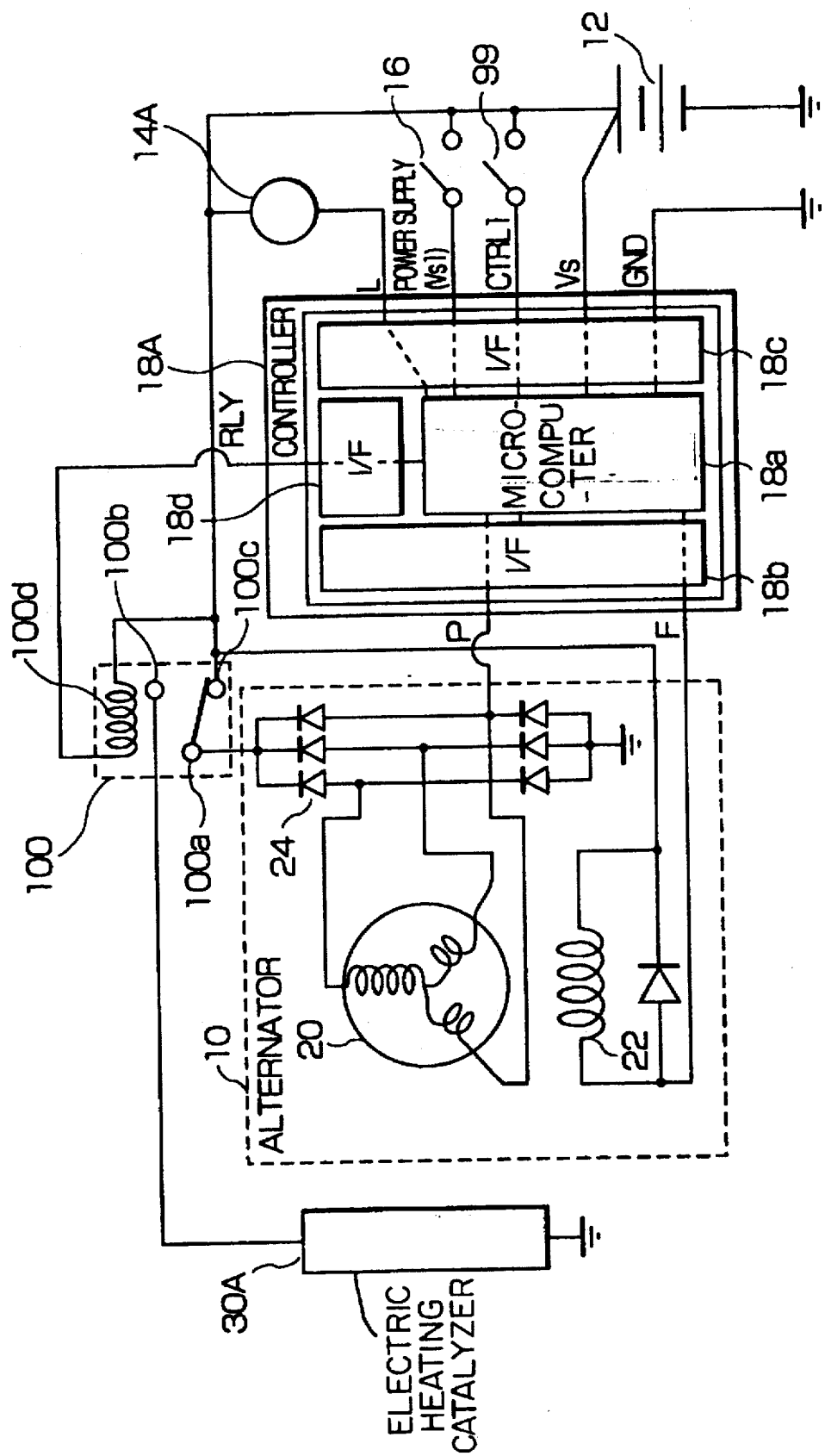
FIG. 1 is a circuit diagram showing the constitution of an embodiment of the present invention.
Figure 7:
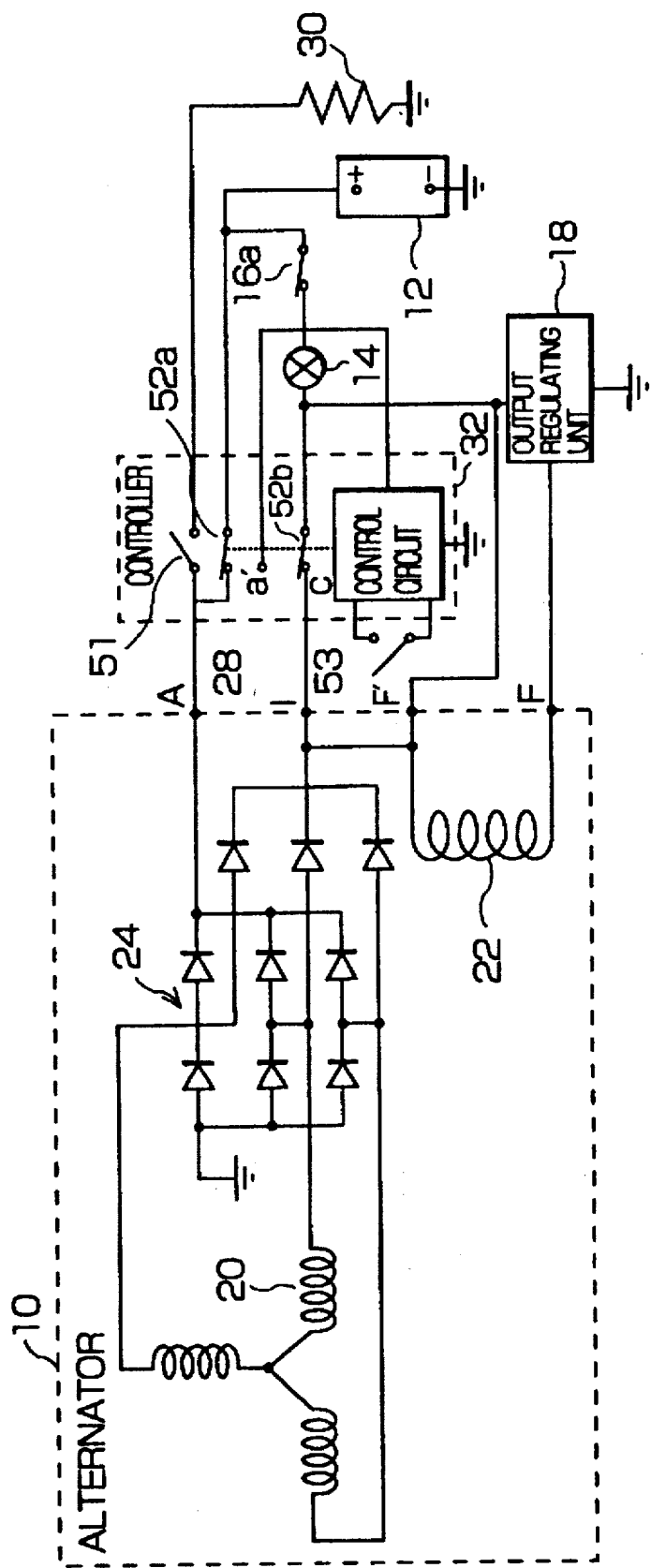
FIG. 7 is a circuit diagram showing the constitution of a conventional alternator power-supply type electric heating control apparatus.

A preferred embodiment of the present invention will be described in reference to FIG. 1. In the drawing the same reference numerals as used in FIG. 7 represent the same or equivalent parts and therefore their description is omitted here.

A description of this embodiment will be made where an electric heating catalyzer 30A is heated as the object to be heated.

A controller 18A has a microcomputer 18a and interfaces 18b to 18d incorporated therein so that a means regulating an output of an alternator 10, a means switching a relay 100 serving as a switch, a means detecting a failed state in which a terminal for detecting an output of the alternator is failed, and a means driving a charge lamp 14A which is a display unit to warn a driver of the failed state are realized. Also, this controller 18A constitutes an object to be heated voltage control unit, as described in step S7 (which is described later), and constitutes an engine failure judgment unit, as described in FIG. 3(b).

Between the interface 18c of the controller 18A and a battery 12 there is provided a heating switch 99. The heating switch 99 is closed manually or by an object to be heated drive instruction from another computer (not shown) to perform the current conduction to the electric heating catalyzer 30A.

One end of the excitation coil 100d of the relay 100 is connected to the interface 18d of the controller 18A, and the other end is connected to the battery 12. Also, the movable contact 100a of the relay 100 is connected to the output side of a rectifier 24, and the stationary contacts 100b and 100c where the movable contact 100a is connected by switching are connected to the electric heating catalyzer 30A and the battery 12, respectively, so that the output of the alternator 10 is switched to the battery 12 side or the electric heating catalyzer 30A side.

Figure 2:
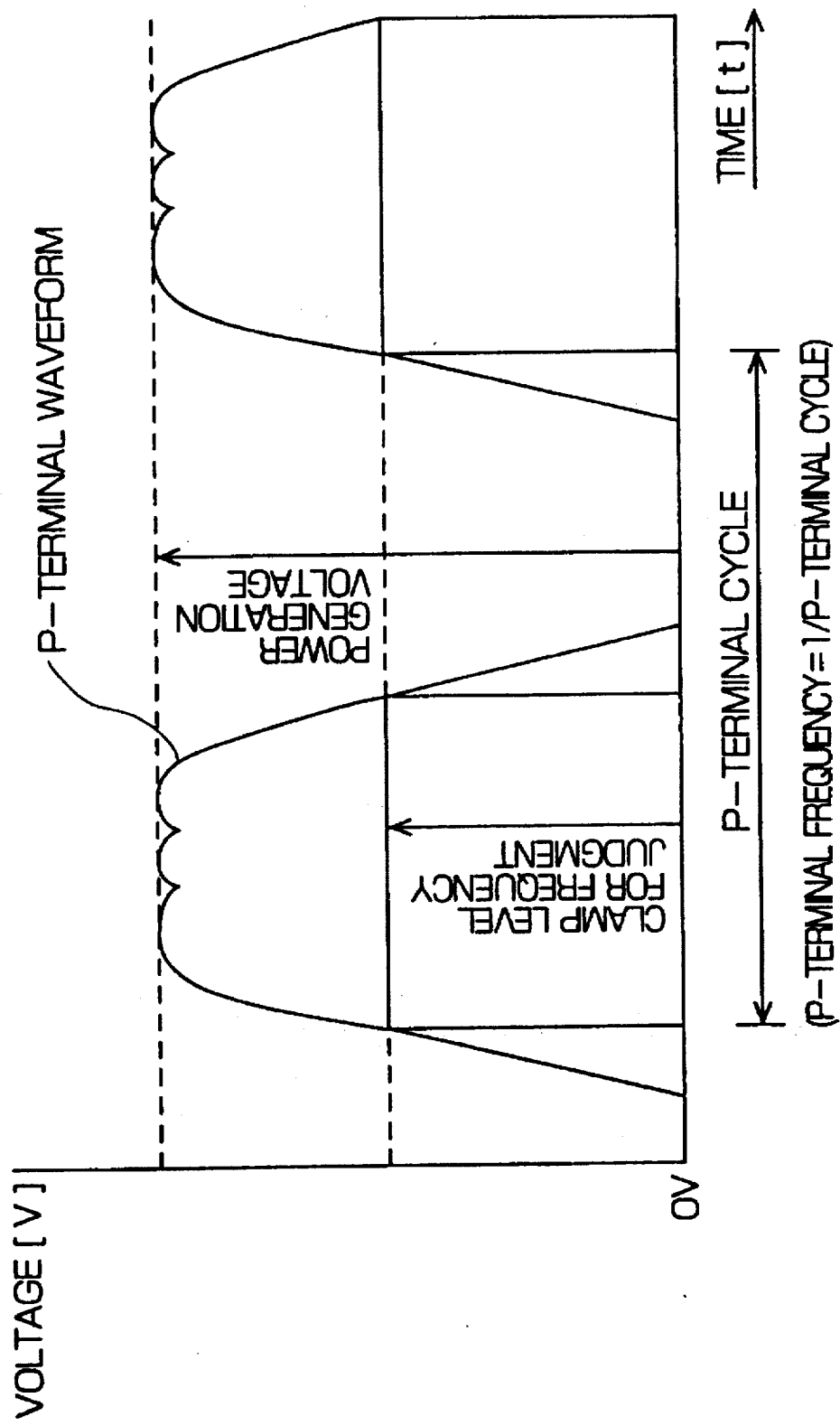
FIG. 2 is a diagram showing the waveform of the P terminal of the embodiment.

For an input signal to the controller 18, an input signal P which is input to the interface 18b of the controller 18 is a rectification wave where one of the output of the alternator 10 rectified by the rectifier 24. As shown in FIG. 2, this rectification wave has a frequency synchronized with the rotational frequency of the alternator (which becomes a function of engine rpm because the alternator is driven by the engine), and the amplitude becomes equal to the power generation voltage of the alternator. Also, Vs which is input to the interface 18c is the voltage of the battery.

In addition, Vsi represents a power supply input to the controller 18, and this power supply input line also serves as an auxiliary line of a line detecting the battery voltage. CTRL1 represents a heating request signal. An output signal F which is output by the interface 18b is a signal for switching a field current, and the switching is performed by an electronic switch (not shown) such as an FET or a transistor. An output signal RLY from the interface 18d is a signal for driving the relay, and an output signal L from the interface 18c is a signal for driving the charge lamp.

Figure 3:
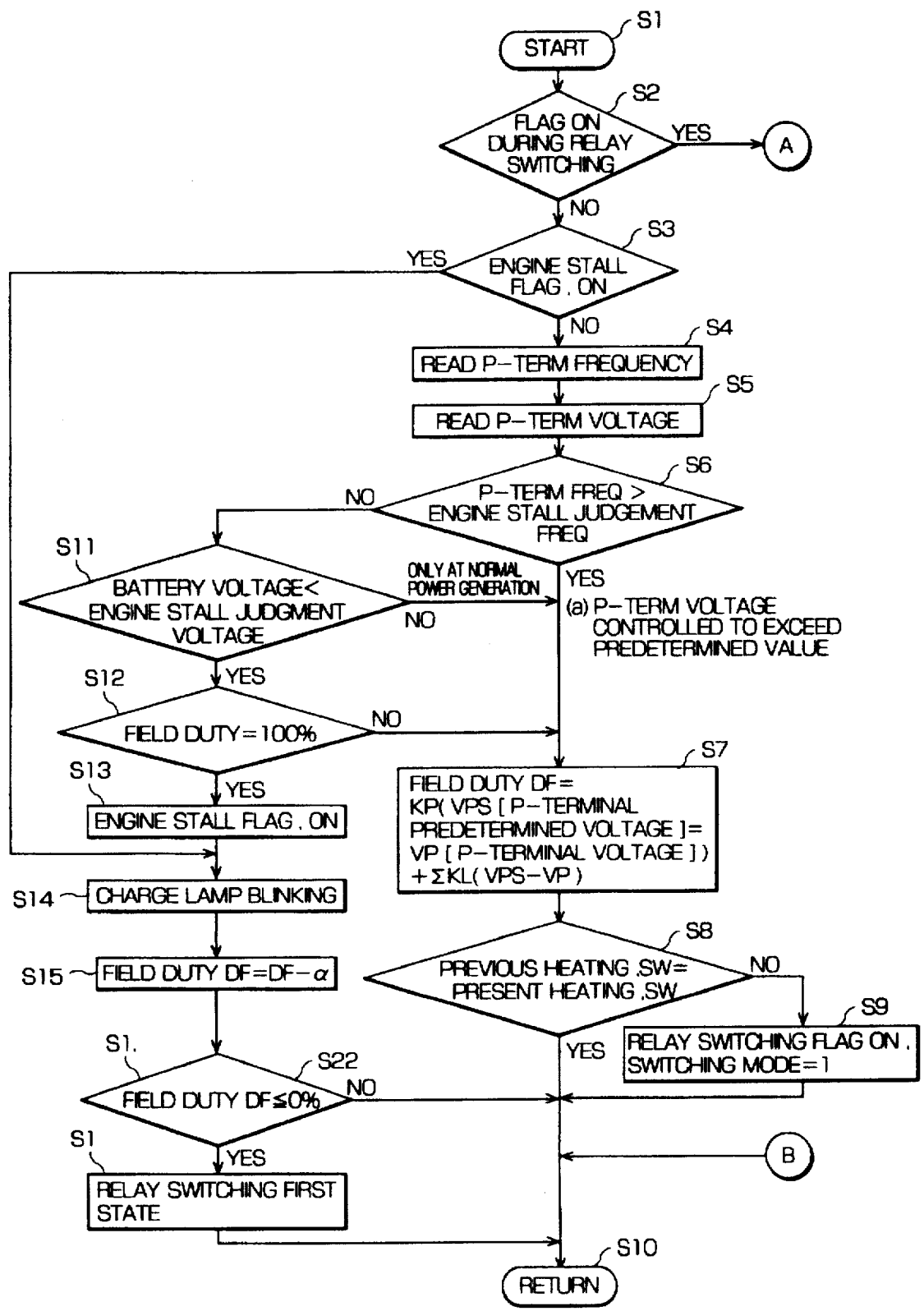
FIG. 3 is a flowchart showing the operation of the embodiment.
Figure 4:
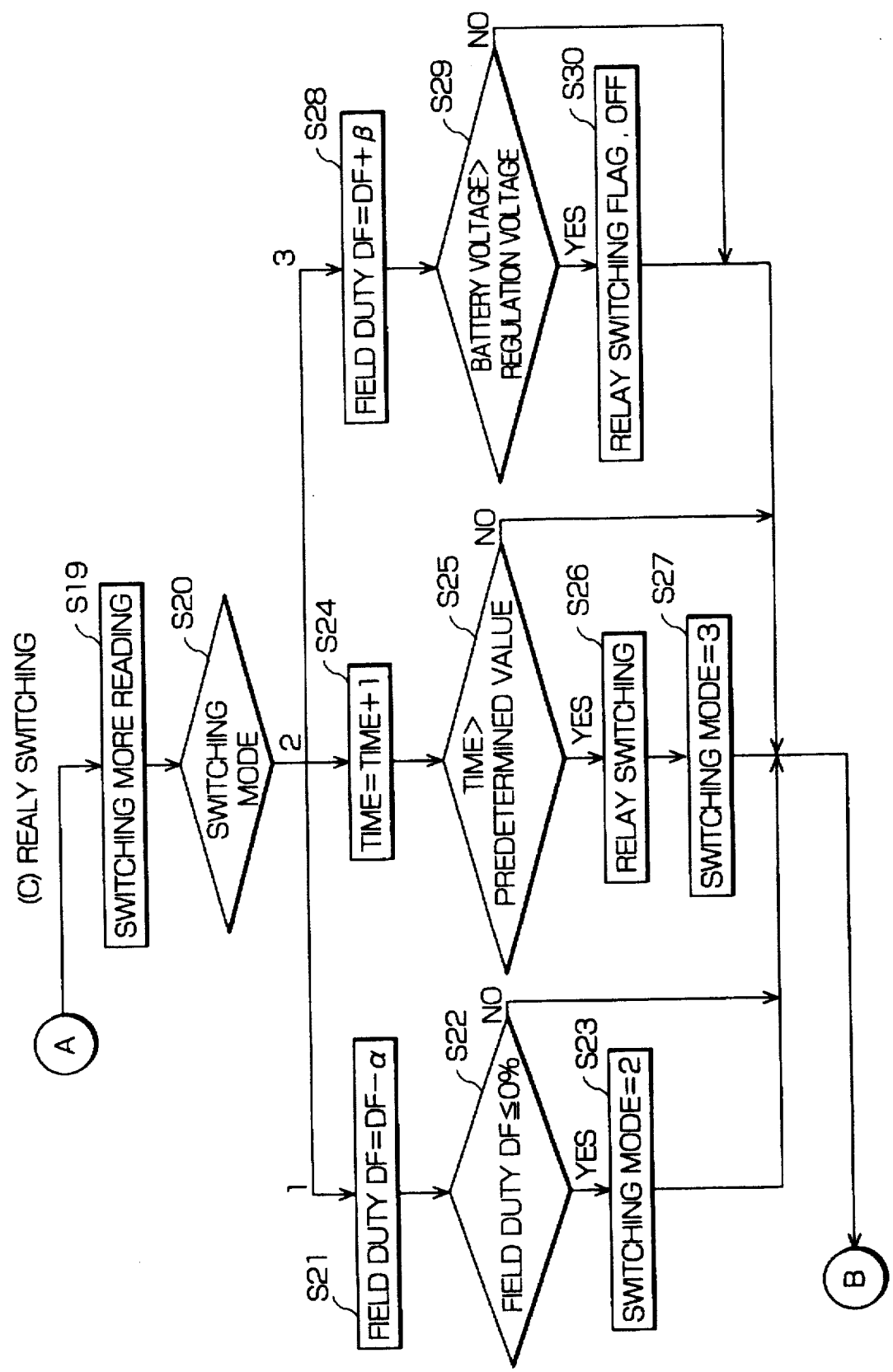
FIG. 4 is a flowchart showing the operation of the embodiment.

Now, the operation will be described with FIGS. 3 and 4. These drawings show the operation of a second state where the current conduction to the electric heating catalyzer 30A is performed and an electric power is supplied in order to heat the electric heating catalyzer 30A. Reference characters S in FIGS. 3 and 4 represent steps. If processing is started in step S1, whether a relay switching flag is on will be judged in step S2. If the flag is off, the processing will advance to step S3, and if the flag is on, the processing will advance to step S19 shown in FIG. 4.

In step S3, it is determined whether an engine stall flag is on. If the flag is off, the processing will advance to step S4, and if the flag is on, the processing will advance to step S14. In step S4 the frequency of the P-terminal is read in and the processing advances to step S5. In step S5 the voltage of the P-terminal is read in and the processing advances to step S6. In step S6 the P-terminal frequency is compared with a previously set engine stall judgment frequency. If the P-terminal frequency is greater than the engine stall judgment frequency, the processing will advance to step S7. If, on the other hand, the P-terminal frequency is less than the engine stall judgment frequency, the processing will advance to step S11.

Step S7 shows processing where the field current is controlled with the rectification wave of one phase obtained by the P-terminal voltage in order to prevent an excessive voltage from being applied to the electric heating catalyzer 30 during the current conduction to the electric heating catalyzer 30. This processing is performed by detecting the voltage applied to the electric heating catalyzer 30. In step S7 a field duty DF is obtained by PI calculation shown in the following equation.

$$\text{Field duty } DF = KP(VPS-VP) + \Sigma KI(VPS-VP)$$

where KP is a previously set proportional coefficient, VPS is the upper limit of the power generation voltage during heating of a preset object to be heated, VP is the present power generation voltage read in by the P-terminal, and KI is an integration coefficient.

In step S8 the present information on a heating switch 99 is compared with the previous information on the heating switch 99. If these pieces of information are the same, the processing will advance to step S10, and if these pieces of information are different, the processing will advance to step S9. When the processing advances to step 10, the processing returns to step S1 and similar operation will hereafter be repeated. The foregoing is the heating operation of a normal object to be heated.

If in step S6 the F-terminal frequency is smaller than the engine stall judgment frequency, in step S11 the battery voltage is compared with a previously set engine stall judgment voltage. If the battery voltage is greater than the engine stall judgment voltage, step S11 will advance to step S7. If, on the other hand, the battery voltage is less than the engine stall judgment voltage, step S11 will advance to step S12.

When in step S6 the battery voltage is lower than the engine judgment voltage, in step S12 it is determined whether the field duty is 100%. If the field duty is 100%, it will be judged that the engine stall judgment is established, and step S12 will advance to step S13. If, on the other hand, the field duty is not 100%, step 12 will advance to step S7. In step S13 the engine flag is turned on and step S13 advances to step S14. In step S14 the charge lamp 14A is turned on in order to warn the driver of an engine stall, and step S14 advances to step S15. In step S15 the value of field duty DF is obtained by the following equation.

$$\text{Field duty } DF = DF - \alpha$$

where α is the previously set decreasing constant of the field duty. Step S15 advances to step S16, and in step S16 it is determined whether the field duty has been reduced to less than 0%. If YES, step S16 will advance to step S18, and if NOT, step S16 will advance to step S10.

In step S18 the relay is switched to the first state, and step S18 advances to step S10. The foregoing is the operation of the engine stall judgment. Now, the reason why the condition "the P-terminal frequency is less than a predetermined value," "field duty 100%," and "the battery voltage is less than a predetermined value" is added to the engine stall judgment will be described. Since basically the P-terminal frequency becomes a function of engine rpm, a case where the P-terminal frequency becomes less than a predetermined value can be judged as an engine stall.

Since the P-terminal output is generated by the alternator 10, the P-terminal output will not become a function of engine rpm when there is no power generation. In order to distinguish between no power generation and engine stall to perform an engine stall judgment, the field duty is used as information as to whether there is power generation. And, at the time of normal power generation, judgment is performed using the battery voltage and the P-terminal frequency as outputs, and at the time of the heating of an object to be heated, judgment is performed using the P-terminal frequency as an output. More specifically, if judgment is performed only with the P-terminal frequency, there will be the possibility that at the time of the switching of the relay engine stall will be determined even though no engine stall actually occurs, because at the time of switching the relay power generation is stopped once. For this reason, if the condition that the field duty be 100% is added to the judgment conditions as well as the condition that the frequency of the P-terminal output be less than a predetermined value even though a power generation request has occurred, then judgment of an engine stall state can be determined while distinguishing between a state of a true engine stall and a state of no power generation.

Also, during the time of normal power generation, in order to distinguish a P-terminal disconnection state (failed state) and an engine stall state, judgment is performed by determining that the condition "the field duty is 100% and the battery voltage is less than a predetermined value" is established and also determining that the condition "the P-terminal is less than an engine stall judgment frequency" is established.

When it is judged in step S8 that the heating switch 99 has been switched, in step S9 the switching flag is set to ON and a switching mode is set to 1. Since in step S2 the relay switching flag has been turned on, in step S9 the switching mode is read in and in step S20 the operation is divided by the switching mode.

Here, the processing advances to step S21 when the switching mode is 1, advances to step S24 when the switching mode is 2, and advances to step S28 when the switching mode is 3. In step S21, field duty DF=DF−α is calculated, and the processing advances to step S22. In step S22 it is determined whether the field duty is 0% or less. If the field duty DF is 0% or less, the processing will advance to step S23. If, on the other hand, the field duty DF is greater than 0%, the processing will advance to step S10. In step S23 the switching mode is set to 2 and the processing advances to step S10. In step S24, TIME=TIME+1 is calculated, and the processing advances to step S25. In step S25, TIME is compared with a previously set relay waiting time. If TIME is greater than the set time, the processing will advance to step S27. If, on the other hand, TIME is less than the set time, the processing will advance to step S10.

In step S27 the relay is switched and the processing advances to step S28. In step S28 the switching mode is set to 3 and the processing advances to step 10. In step S28 where processing is executed when it is judged in step S20 that the switching mode is 3, field duty DF=DF+β (where β is a previously set increasing constant as excitation is removed) is calculated. Then, the processing advances to step S29. In step S29 the battery voltage is compared with a previously set regulation voltage. If the battery voltage exceeds the regulation voltage, the processing will advance to step S30. If, on the other hand, the battery voltage does not exceed the regulation voltage, the processing will advance to step S10.

The foregoing is the operation of the relay switching and although only the switching from the second state (heating state of electric heating catalyzer 30A) to the first state (at the time of normal power generation) has been described in particular, if the determination in step S29 is changed to whether the field duty is 100%, then the switching judgment operation from the first state to the second state will be shown.

Figure 5:
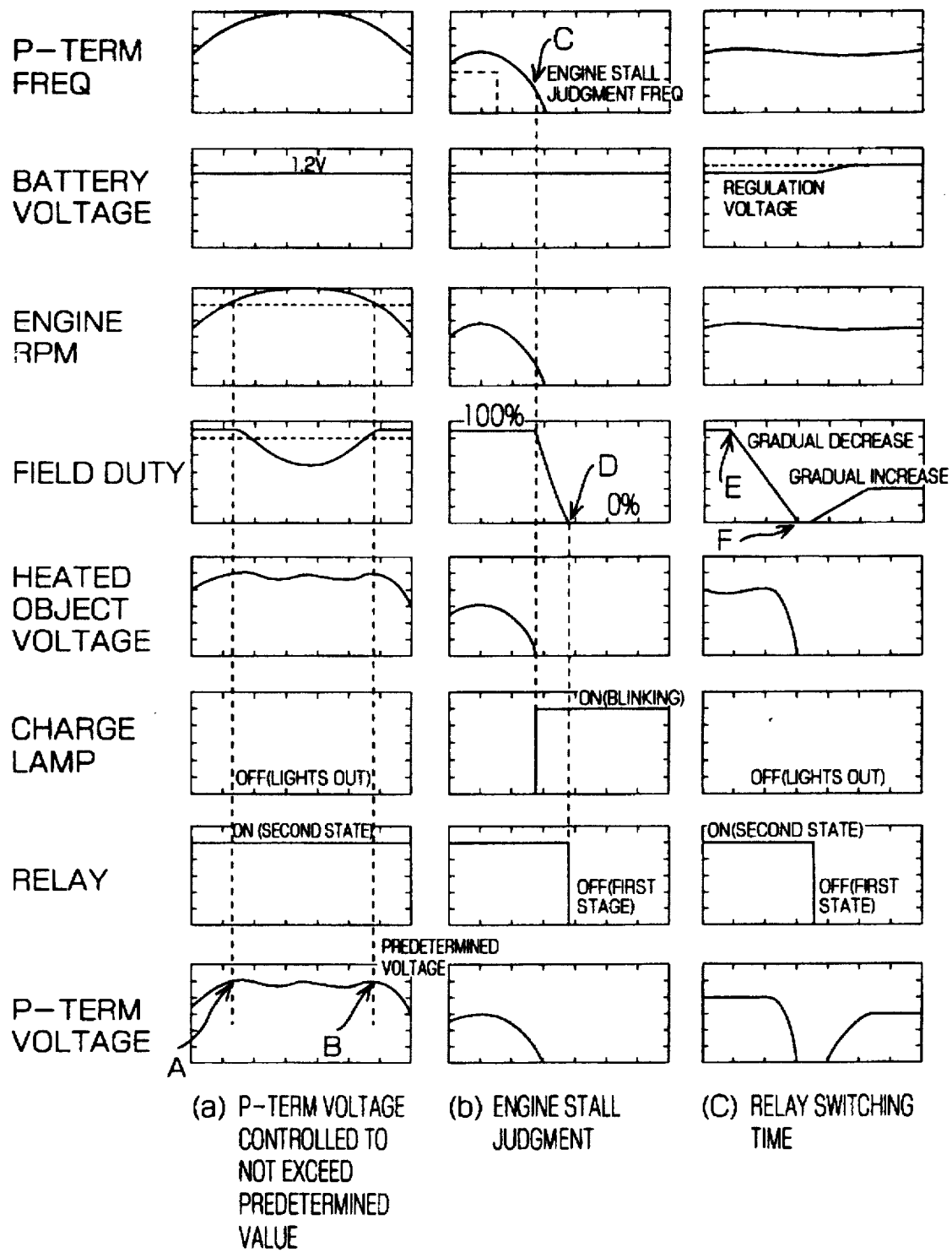
FIG. 5 is a timing diagram showing the operation of the embodiment.

FIG. 5 is a timing chart in the aforementioned operation. FIG. 5(a) shows a case where control is provided so that the P-terminal voltage does not exceed a predetermined value, FIG. 5(b) shows the engine stall judgment, and FIG. 5(c) shows the operation of the relay switching. FIGS. 5(a), 5(b), and (c) correspond to the operations of (a), (b), and (c) shown in FIGS. 3 and 4, respectively.

More specifically, in FIG. 5(a) the field duty is regulated and reduced because the P-terminal voltage exceeds a predetermined value at an A-point due to a rise in engine rpm. At a B-point, the field duty is maintained to 100% because the P-terminal voltage would not exceed a predetermined value even if the field duty were set to 100% because of a reduction in engine rpm.

In FIG. 5(b), the P-terminal frequency becomes less than the engine stall judgment frequency at a C-point, and at that time, engine stall is determined because the battery voltage is 12 V, which is less than the engine stall judgment voltage and the field duty is also 100%. The charge lamp 14A is caused to blink. After the field duty is set to 0% at a D-point, the switching of the relay 100 is performed.

In FIG. 5(c), a relay switching request (not shown) occurs at an E-point and the field duty is gradually reduced. At an F-point, the field duty becomes 0% and the switching of the relay is performed after a predetermined time. Thereafter, the field duty is gradually increased.

Embodiment 2

Figure 6:
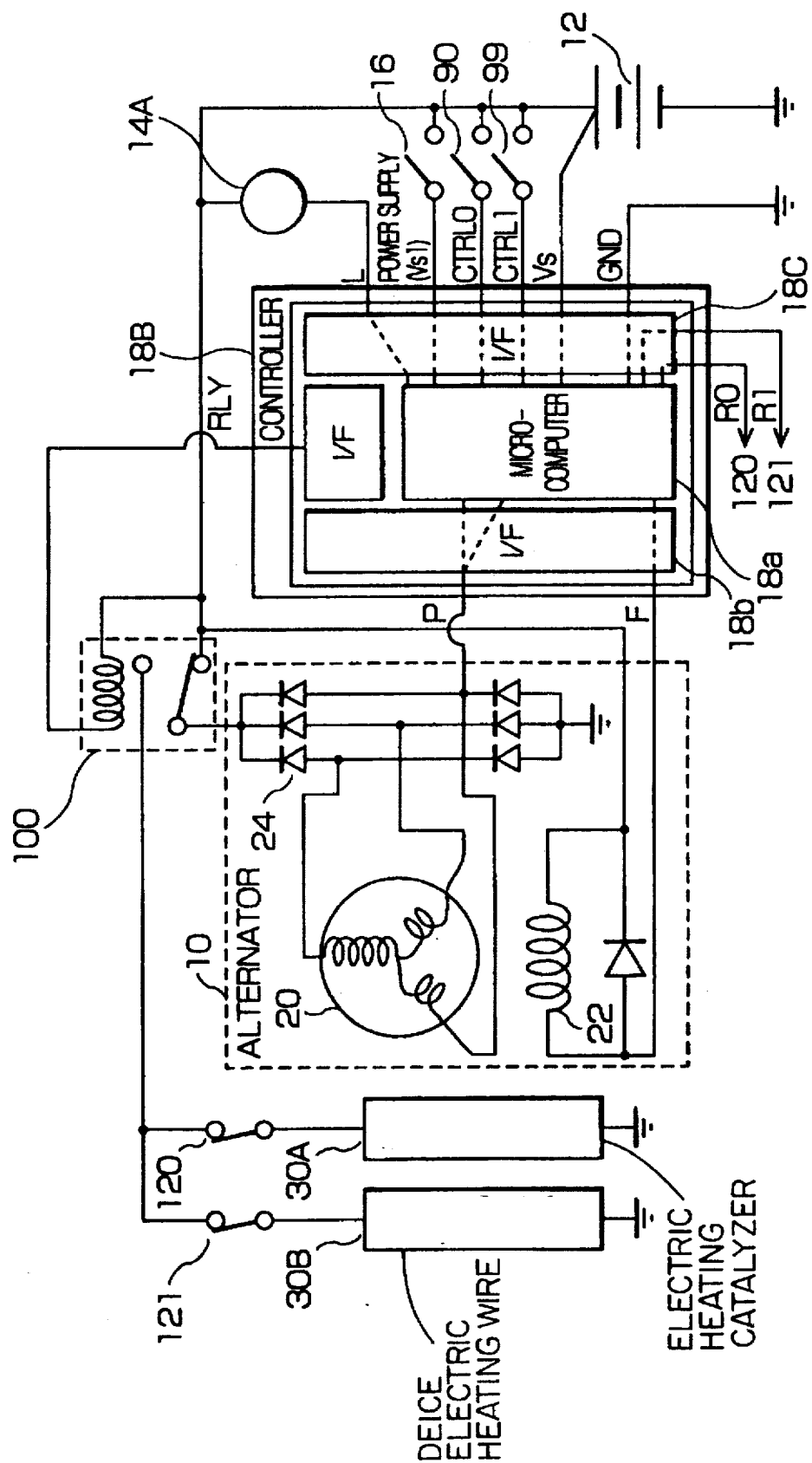
FIG. 6 is a circuit diagram showing the constitution of another embodiment of the present invention.

Embodiment 2 of this invention will hereinafter be described with reference to FIG. 6. In the drawing the same reference numerals as FIG. 1 denote parts which are identical or equivalent to those of FIG. 1. The embodiment shown in FIG. 6 is different from the embodiment of FIG. 1 in that an ice removing electric heating wire 30B serving as an object to be heated is provided in parallel with an electric heating catalyzer 30A and, furthermore, a heating switch 90 of the ice removing electric heating wire 30B is provided in addition to a heating switch 99 of the electric heating catalyzer 30A.

A switch 120 is a normally closed electromagnetic switch connected to the electric heating catalyzer 30A in order to drive the electric heating catalyzer 30A. A switch 121 is a normally closed electromagnetic switch connected to the ice removing electric heating catalyzer 30B in order to drive the ice removing electric heating catalyzer 30B. R0 representative of an output signal of a controller 18B is a signal driving the electromagnetic switch 120, and R1 is a signal driving the electromagnetic switch 121.

The operation differs from the embodiment of FIG. 1 in the following points. When the heating switch 90 and the heating switch 99 are both on, both of the electromagnetic switches 120 and 121 are turned on by means of both signals R0 and R1. Also, when only the heating switch 90 is on, the electromagnetic switch 121 is turned off and the electromagnetic switch 120 is turned on. At this time, a predetermined value limiting power generation voltage is determined based on data as to the connection state of the objects to be heated and data as to a predetermined value limiting a power generation voltage. For example, when the electric heating catalyzer 30A and the ice removing electric heating wire 30B, which are objects to be heated, are both driven and the current conduction to 30A and 30B is performed, a voltage being equally applied to both 30A and 30B is detected and a voltage control is performed by limiting the field current so that the detected voltage does not exceed a smaller one of the limitation voltages of the objects to be heated. Also, when only one of the objects to be heated is being driven, only the applied voltage on the object to be heated being driven is detected. Therefore, the field current can be controlled so that the detected voltage does not exceed the limitation voltage of the object to be heated being presently driven.

What is claimed is:

1. An alternator power-supply type electric heating control apparatus, comprising:

a switch for switching an output of an alternator including a field coil, a stator coil, and a rectifier to a first state where said output is connected to a battery and vehicle-mounted electrical load side or a second state where said output is connected to an object to be electrically heated;

a controller which controls an output of said alternator by a duty control of a field current that is supplied to said field coil, performs the switching of said switch, detects a failed state in which a terminal for detecting an output of the alternator is failed, and controls a display unit to display said failed state; and voltage control means for controlling said duty control of said field current by means of one phase of an output voltage of said alternator so that a voltage supplied to said object does not exceed a predetermined value.

2. The alternator power-supply type electric heating control apparatus as set forth in claim 1, further comprising engine stall judgment means for performing an engine stall judgment, based on a rectified wave from said rectifier, said field duty of said duty control, and voltage of said battery, and wherein said controller disconnects said field current at the time of said engine stall judgment and, when said engine stall judgment is performed in said second state, switches said switch to said first state.

3. The alternator power-supply type electric heating control apparatus as set forth in claim 2, wherein said controller warns the driver of an occurrence of an engine stall by means of said display unit, when said engine stall judgment is performed.

4. The alternator power-supply type electric heating control apparatus as set forth in claim 1, wherein, when said switching of said switch is going to be performed, said controller gradually reduces said field duty of said duty control before said switching, forcibly stops power generation of said alternator at the time of said switching, and gradually increases said field duty after said switching.

5. An alternator power-supply type electric heating control apparatus, comprising:

a switch for switching an output of an alternator including a field coil, a stator coil, and a rectifier to a first state where a battery and vehicle-mounted electrical load side is connected to said output or a second state where all of a plurality of objects to be heated which are heated by current conduction are selected and connected to said output at the same time or some of said plurality of objects to be heated are selected and connected to said output;

a controller having means regulating an output of said alternator to a regulation voltage, means performing the switching of said switch, means detecting a failed state in which a terminal for detecting an output of the alternator is failed, and means warning a driver of said failed state by means of said display unit; and voltage control means for selecting and connecting said plurality of objects to be heated, based on input information, and controlling said duty control of said field current by means of one phase of an output voltage of said alternator so that voltages of said objects to be heated do not exceed a predetermined value, and varying said predetermined value in accordance with a connection state of said objects to be heated.

* * * * *